United States Patent
Rankin et al.

(10) Patent No.: US 7,146,397 B2
(45) Date of Patent: *Dec. 5, 2006

(54) NETWORKED MESSAGE DELIVERY SYSTEM

(75) Inventors: Paul J. Rankin, Horley (GB); Simon R. Turner, Redhill (GB); Stefan Pannenbecker, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 535 days.

This patent is subject to a terminal disclaimer.

(21) Appl. No.: 09/829,091

(22) Filed: Apr. 9, 2001

(65) Prior Publication Data

US 2002/0002601 A1    Jan. 3, 2002

(30) Foreign Application Priority Data

Apr. 15, 2000    (GB) ................................. 0009251.0

(51) Int. Cl.
*G06F 15/16*    (2006.01)
(52) U.S. Cl. ................ 709/203; 709/206; 709/217; 709/219; 709/249; 715/745
(58) Field of Classification Search ................ 709/203, 709/217–218, 224, 228, 249, 219, 206; 340/825.49; 715/745; 455/433, 517
See application file for complete search history.

(56) References Cited

U.S. PATENT DOCUMENTS

| 4,173,016 | A | 10/1979 | Dickson ................... 343/6.8 R |
| 5,768,633 | A | 6/1998 | Allen et al. ..................... 396/2 |
| 5,835,861 | A | 11/1998 | Whiteside ................... 455/466 |
| 6,556,659 | B1 * | 4/2003 | Bowman-Amuah ........ 379/9.04 |
| 6,571,279 | B1 * | 5/2003 | Herz et al. .................. 709/217 |
| 6,697,842 | B1 * | 2/2004 | Smith et al. ................ 709/206 |
| 2002/0122061 | A1 * | 9/2002 | Martin et al. ............... 345/762 |

FOREIGN PATENT DOCUMENTS

| EP | 0944002 A1 | 3/1998 |
| EP | 0888025 A2 | 6/1998 |
| EP | 888025 A2 * | 12/1998 |
| JP | 08076706 A | 9/1994 |
| WO | WO9933293 | 12/1998 |
| WO | WO 9933293 A1 * | 7/1999 |

OTHER PUBLICATIONS

Stergiou, C., PCT International Search Report for PCT/EP01/04026, Mar. 12, 2001.*
Venky Drishnan, "Location Awareness in HP's Cooltown", (abstract).
Tim Kindberg et al, "People, Places, Things: Web Presence for the Real World", (abstract).

* cited by examiner

*Primary Examiner*—Frantz B. Jean
(74) *Attorney, Agent, or Firm*—Michael E. Belk; Paul Im

(57) ABSTRACT

In a networked communications apparatus comprising at least one server (10) and a plurality of user terminals (12), together with a portable communications device (18) co-operating with one or more user terminals (12), the coupling (14) between terminal and communications device is by wireless transmission. The portable communications device (18) means for receiving wireless transmissions from the terminal are further configured to receive additional data transmitted wirelessly from other sources, such as message delivery beacons (B1–BN) distributed in the locality.

20 Claims, 2 Drawing Sheets

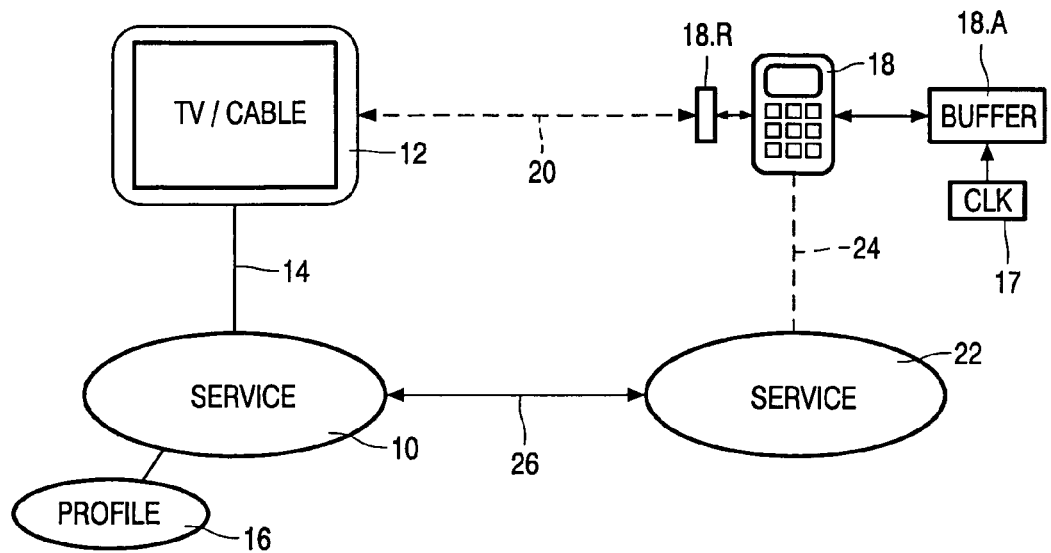
FIG. 1
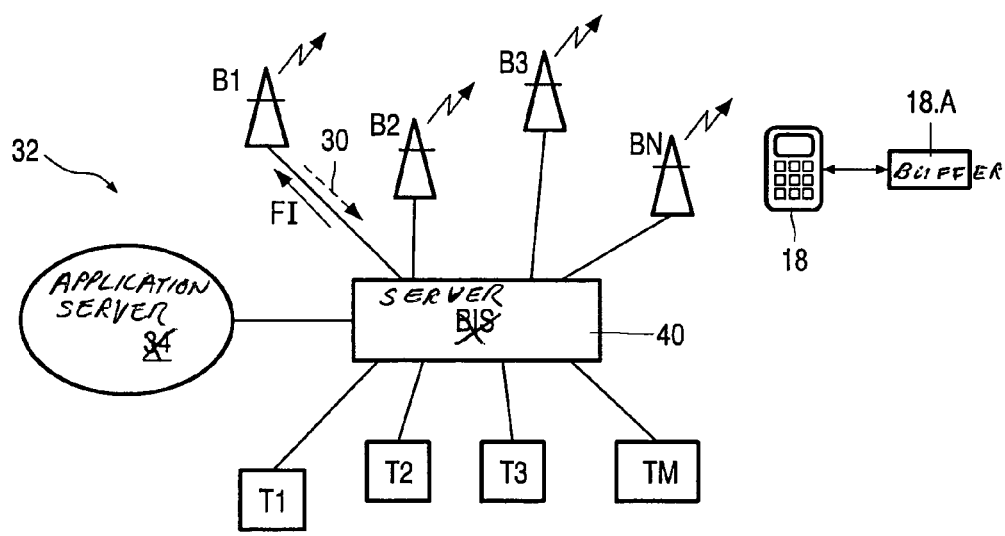
FIG. 2
| id | SS | Ci | SD | QoS | pi |
FIG. 3

NETWORKED MESSAGE DELIVERY SYSTEM

The present invention relates to methods and apparatuses for delivering data to a user and, in particular, to systems where such data is selected from a larger store automatically and on the basis of a compiled profile of the user.

An example of such a system provides a communications method and a communications network comprising a server and a plurality of user terminals. The user terminals can share information with each other and with the server by means of an interconnecting network, especially the Internet. On the server, a profile database is provided containing data representing a characteristic behavior of associated user addresses. The server automatically acquires this representative data in response to activities performed by the associated users of the network, which data is stored with the associated user addresses in the profile database n the server.

The particular concern with the system of EP-A-0 944 002 is to avoid an incorrect or inappropriate profile specification being built up for a user and, to this end, the described profile database can be accessed by the user at any time such that the user can modify the content of the database in relation to the contents associated with one of the addresses associated with that user. The user can modify the contents by, for example, adding, deleting, or amending subject matter in the profile database.

In another example of a data delivery system, Hewlett-Packard has posted a publication on the Web at <http://www.cooltown.hp.com/papers/webpres/WebPresence.htm> about their "Cooltown" project. The convergence of Web technology, wireless networks and portable client devices provides design opportunities for computer/communications systems. In the Cooltown project, systems that are location-aware can be created using URL's for addressing, physical URL's for delivery via beacons and sensing of URL's for discovery, and localised web servers for directories. The systems are ubiquitous to support nomadic users. On top of this infrastructure the Internet connectivity can be leveraged to support communications services. Web presence bridges the World Wide Web and the physical world inhabited by the users, providing a model for supporting nomadic users without a central control point.

The Cooltown Museum and Bookstore offers visitors a Web-enhanced experience. As visitors tour the museum, their portable digital assistant (PDA) can receive Web URLs from wireless "beacons". These beacons are small infrared transceivers located close to pictures or sculptures; the URLs link into a Web of information about the items. Using the PDA's Web browser, visitors can read or hear about the artist or the work and about related art works in the museum. The URLs can also be stored as bookmarks for further study or they can be used to select reproductions of the artwork from the museum's online store.

In accordance with a first aspect of the present invention, there is provided a networked communications apparatus comprising at least one server and a plurality of user stations, wherein the user stations comprise terminals which can receive information from the at least one server by means of a connection via a first network, the apparatus further comprising:

storage means holding a profile database, which profile database contains data representing a characteristic behaviour of an associated user terminal network address or addresses, the data being acquired automatically in response to an activity of the associated user and being stored together with the associated user terminal network address or addresses in the profile database;

wherein the user station further comprises a portable communications device coupled with said terminal and connectable to said at least one server via a second network, wherein the coupling with said terminal is by wireless transmission therefrom, and the portable communications device means for receiving wireless transmissions from the terminal are further configured to receive additional data transmitted wirelessly from other sources than said second network.

By using the same wireless link receiver in the portable device for communicating with the terminal and for receiving additional data (which may, for example, comprise data from beacons in a similar manner to the Cooltown scenario), the functionality of the system of linked terminal and mobile is enhanced without additional equipment penalties.

In a preferred embodiment, the portable communications device may comprise a mobile telephone with the second network being a telecommunications network. The wireless transmission of additional data suitably conforms to a predetermined set of communications protocols, such as "Bluetooth". The first network may be the Internet and the user terminals may comprise at least a display device coupled with processor means hosting an Internet browser and user-operable means for control of the same.

The invention also provides a portable communications device for use in the above-described networked apparatus and having means for receiving wireless transmissions from the terminal. The portable communications device may further comprise a buffer arranged to receive and store said additional data transmitted wirelessly. The device may further comprise a clock signal source and be arranged to stamp items of received additional data with the time of receipt. Also, the device may further comprise user-operable data input means by operation of which the user is enabled to annotate or alter items of received additional data.

In accordance with a further aspect of the present invention, there is provided a communication method for a networked system comprising at least one server and a plurality of user stations, wherein the user stations comprise terminals which can receive information from the at least one server by means of a connection via a first network, wherein a profile database is provided, which profile database contains data representing a characteristic behaviour of an associated user terminal network address or addresses, the data being acquired automatically in response to an activity of the associated user and being stored together with the associated user terminal network address or addresses in the profile database;

the user station further comprising a portable communications device coupled with said terminal and connectable to said at least one server via a second network, the coupling with said terminal is by wireless transmission therefrom, and the portable communications device means for receiving wireless transmissions from the terminal are further configured to receive additional data transmitted wirelessly from other sources than said second network.

According to the method the first network may be the Internet and the received additional data may comprise one or more Uniform Resource Locators. The method may further comprise the provision of a plurality of short range beacons distributed about a geographical location, with each of these beacons transmitting a respective item of said additional data to the or each portable communications device when it is in range.

Further features and advantages of the present invention will become apparent from reading of the following description of preferred embodiments, given by way of example only, and with reference to the accompanying drawings, in which:

FIG. 1 represents a coupled arrangement of user terminal and portable communications device;

FIG. 2 represents an exemplary implementation of messaging beacon infrastructure;

FIG. 3 represents a message format for transmission in a beacon slot in the arrangement of FIG. 2;

Figure 4:
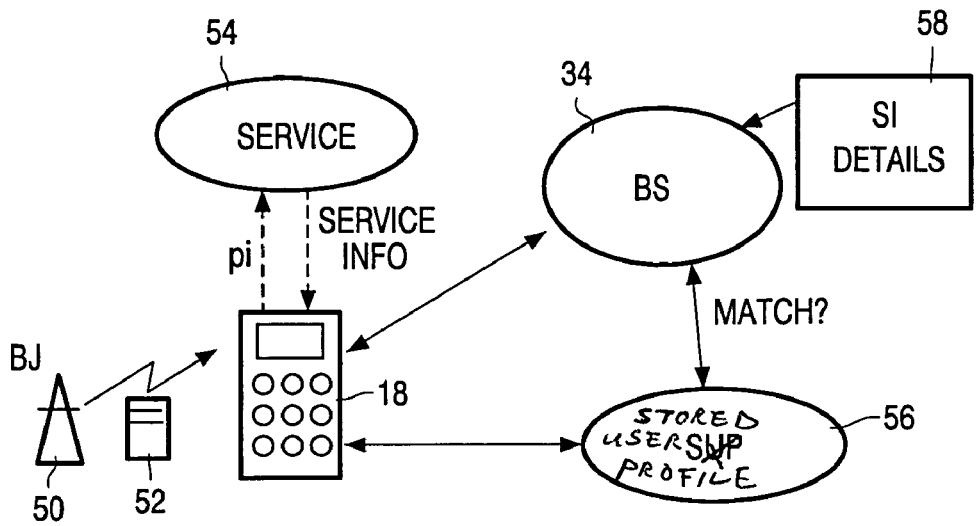
FIG. 4 shows the transmission of messaging slots from a beacon to a mobile device.

FIG. 1 schematically represents components embodying the present invention and in the form of a networked communications apparatus comprising at least one server or service provider 10 coupled to a plurality of user stations 12 (only one of which is shown) via a link 14 which may comprise a network connection, wireless or cable link, or other data transfer means. The server 10 includes at least one storage means 16 holding a profile database, which profile database contains data representing a characteristic behaviour of an associated user as identified by their terminal network address or addresses. The server builds up the user profile data by automatically acquiring such data in response to one or several selected activities of the associated user, such as what television channels they watch, what goods they purchase on-line and so forth. This profiling data is then stored together with the associated user terminal network address or addresses in the profile database.

The user station further comprises a portable communications device 18, suitably a mobile telephone, coupled with said terminal 12 as indicated by dashed link 20. As schematically illustrated, the device 18 includes a receiver 18.R configured to the form of coupling with terminal 12, as well as a buffer 18.A for received signals. The device 18 is connectable to said at least one server or service provider 22 via a second network or data link 24, in this case a telecommunications network. As shown by line 26, the means for automatically acquiring user data (server 10) is coupled to the telecommunications service 22 and may use this channel via link 20 as a simple low-cost route for user profiling data being gathered from or by the user terminal 12 or as a back channel for other data required to be sent by said terminal 12 back to server 10. In order to facilitate this connection, the service provider 10 need simply store the users mobile telephone number with the profiling data for that user in the profile database 16. By use of the portable communications device link for the transfer of user profiling data, traffic on the first network or link 14 is kept to within manageable levels such that the user does not associate advanced profiling functionality with system delays.

The link 20 between the portable communications device 18 and the respective user terminal 12 may comprise a wireless (radio frequency or infra-red) link. Additionally, the aforementioned data transfer via said wireless link preferably follows a predetermined set of message transfer protocols, such as those known generically as "Bluetooth". The support for link 18 further enables interaction with a beacon infrastructure where a system of beacons transmit additional data messages to a users portable communications device 18. The beacons provide matrix coverage over a series of locales.

Whilst base stations or beacons will typically be independent of one another (in a shopping mall set up, each shop provides and maintains its own beacon without reference to any beacons provided by neighbouring shops), the beacons may be wholly or partially networked with at least some coordination as to their broadcast messages. FIG. 2 is a diagram of such a system 32 of linked beacons embodying the invention and providing an implementation of an infrastructure for use in, for example, department stores, shopping malls, theme parks, etc. The system 32 comprises a plurality of beacons B1, B2, B3, BN distributed over a series of locales. Each of the beacons B1–BN broadcasts one or more short-range inquiry signals in a time-slot format. The beacons B1–BN are controlled by a beacon infrastructure server (BIS) 40, with one or more terminals T1, T2, T3, TM being connected to the server 40. The terminals T1–TM enable service providers, i.e., the users of beacons B1–BN, to author or edit allocated service slots in the form of added data piggy backed on inquiry facilitation signals transmitted by beacons B1–BN. A service provider may lease a beacon or one of the beacon's service slots from the infrastructure provider. To this end, server 40 provides simple HTML templates for filling out by the user via one of terminals T1–TM. Having filled out the template with, for example, a description of the service and other information for the data to be carried via the beacon broadcast, the template is returned to server 40, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 40 then creates the appropriate additional data package FI for appending to the inquiry signal of a relevant one of the beacons B1–BN based on the information submitted with the template. The system 32 may further comprise a beacon website hosted by an application server 34 to assist in carrying out various functions, as will be readily understood by the skilled reader.

Whilst it is expected that the messages will simply be broadcast to whichever mobile devices 18 are within range of a given terminal (with the user then being able to view the message data on the mobile device), response messages sent by the mobile device back to the broadcasting beacon may be supported, as indicated by dashed line 30. In one preferred embodiment, the mobile device 18 is provided with a buffer (18.A) to build up a log of received messages (optionally time-stamping them on receipt—for which purpose a clock signal source 17 may be provided) which messages can then be studied, perhaps edited on the mobile by use of the device keys, and replied to—for example if containing URL's—at the users leisure. With the buffer, the viewing and responding of messages may be handled by other devices of the user with the captured log being downloaded (e.g. via link 20) when the user is back in the vicinity of these devices.

Services may rent beacon slots from an infrastructure provider, and a typical message form, shown in FIG. 3, might comprise:

id an identifier for the transmitting beacon
SS an identifier for the Service Supplier
Ci specification of the Service Class
SD (optionally) further service details
QoS specification of Quality of Service
pi one or more connection pointers.

The connection pointers pi may be prefixed by a pointer type (eg.SMS, 1-800 -#,url). One service may have alternative pointers for the mobile to activate the service connection. Various qualities of service QoS may be supported by the same service provider, e.g. SMS, Audio interaction, GPRS, WAP etc. These should also be matched against the users preferences, mobile platform options, and cost preferences.

As represented by FIG. 4, each beacon 50 emits, in pulsed mode, a frame 52 of barcode slots offering connection "bridges" i.e. data enabling or supporting connection to various local services. The frame 52 is received by mobile device 18 with a connection pointer pi being used to initiate a service from service provider 54: the service may comprise a telecommunications or web-based service or some other arrangement for information delivery dependent on the capabilities of the mobile device 18. Prior to service activation by service provider 54 with a selected quality of service QoS, a negotiation or comparison process occurs between the stored user profile SUP (held in storage at 56) and characteristics of the service class as specified by Ci to optimise the selection of service class and QoS. The chosen QoS should fit the user's context, and acceptable charging rate. Therefore different QoS specifications may have different priorities at different times of the user's day.

Before using pointer pi to activate the service connection si from provider 54 (which may be made over GSM cellnet, SMS, or even over the wireless link 20, optionally following bluetooth protocols) the class Ci (and possibly further details, e.g. QoS) is compared with current subset of the user profile, SUP. The physical location for storage 56 holding the SUP may be on the mobile (e.g. as a table), or remotely on a web site owned by the user, or provided by the beacon infrastructure provider for end users. The first stages of correlating class Ci and further service details against the SUP are preferably automatic. These may happen even before the user is notified by the mobile of the presence of a link to that service.

If a service of class Ci matches a table of classes held on the mobile device 18, then in a first option the user is alerted and may with a single key press on the mobile 18 activate the service pointer pi. In an alternative arrangement, the mobile 18 first automatically issues (e.g. via SMS) a request to remote beacon website BS hosted by application server 34 for a more exact correlation between the services details (as held in local storage 58 by application server 34) and the stored SUP. If the service is deemed to match the user's current interest and intent, a positive answer is returned to the mobile 18 and only then is the user alerted by the mobile of the service's presence. The user then has the choice to activate the service automatically via its pointer pi being sent to service provider 54.

Figure 5:
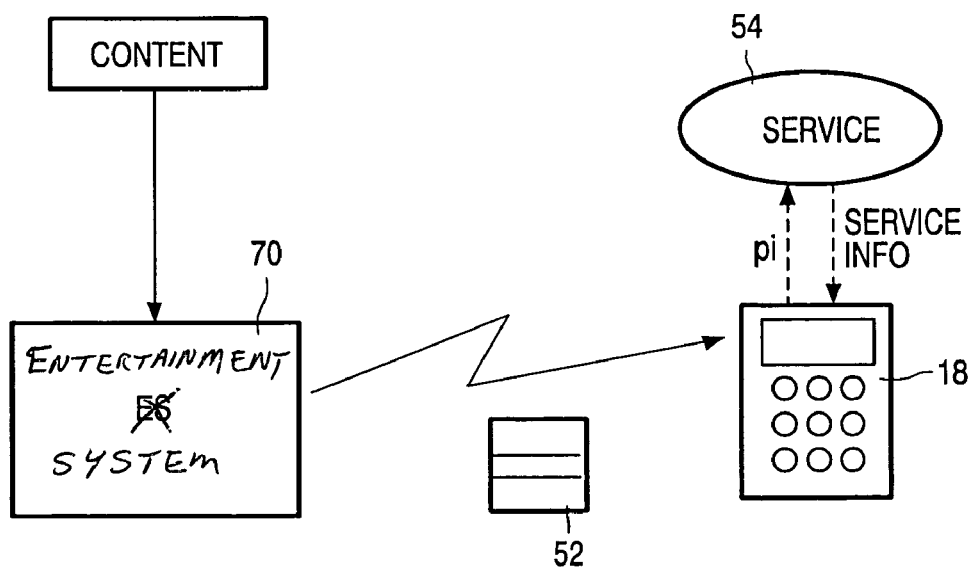
FIG. 5 represents a combined user terminal and portable communications device and its connection to different services.

FIG. 5 represents a further arrangement for TV or music-linked services, with an entertainment system ES 70 (TV, CD Player, MP3 jukebox or games platform for examples) being coupled via the mobile device 18 to the service provider 54 hosting, for example, Cellnet or web-based services.

As before, the frame broadcast by wireless link to the mobile may contain more than one service class, more than one pointer type pi per service offering different QoS and optionally more details of the services on offer.

In an extreme example, a service slot might only contain the identity of a music CD currently being played, plus a pointer pi (e.g. to a phone-based music service or web site) being pre-stored on the mobile. On activating the service via pi, the service is passed the identity of the CD from the beacon slot information, and the music service can be automatically tailored to the current CD.

Although defined principally in terms of a software-based or controlled implementation, the skilled reader will be well aware than many of the above-described functional features could equally well be implemented in hardware or a combination of software and hardware.

From reading the present disclosure, other modifications will be apparent to persons skilled in the art. Such modifications may involve other features which are already known in the design, manufacture and use of telecommunications systems and/or data network access apparatus and devices and component parts thereof and which may be used instead of or in addition to features already described herein.

The invention claimed is:

1. A networked communications apparatus comprising at least one server and a plurality of user stations, wherein each of the user stations comprise a terminal that can receive information from the at least one server by means of a connection via a first network, the apparatus further comprising:

storage means holding a profile database, which profile database contains data representing a characteristic behavior of an associated user terminal network address or addresses, the data being acquired automatically in response to an activity of an associated user and being stored together with the associated user terminal network address or addresses in the profile database;

wherein the user station further comprises a portable communications device coupled with said terminal and connectable to said at least one server via a second network independent of the first network, wherein the coupling between the portable device with said terminal is by wireless transmission therefrom, and the portable communications device includes means for receiving wireless transmissions from the terminal are further configured to receive additional data transmitted wirelessly from other sources than said second network and said terminal.

2. Apparatus as claimed in claim 1, wherein said portable communications device comprises a mobile telephone and said second network is a telecommunications network.

3. Apparatus as claimed in claim 1, wherein the first network is the Internet and the user terminals comprise at least a display device coupled with processor means hosting an Internet browser and user-operable means for control of the same.

4. Apparatus as claimed in claim 1, wherein said wireless transmission of additional data conforms to a predetermined set of communications protocols.

5. A portable communications device for use in the apparatus of claim 1 and having means for receiving wireless transmissions from said terminal.

6. A portable communications device as claimed in claim 5, further comprising a buffer arranged to receive and store said additional data transmitted wirelessly.

7. A portable communications device as claimed in claim 6, further comprising a clock signal source and being arranged to stamp items of received additional data with the time of receipt.

8. A portable comminations device as claimed in claim 5, further comprising user-operable data input means by operation of which the associated user is enabled to annotate or alter items of received additional data.

9. A communication method for a networked system comprising at least one server and a plurality of user stations, wherein the user stations comprise terminals which can receive information from the at least one server by means of a connection via a first network, wherein a profile database is provided, which profile database contains data representing a characteristic behavior of an associated user terminal network address or addresses, the data being acquired automatically in response to an activity of the associated user and being stored together with the associated user terminal network address or addresses in the profile database;

with the user station further comprising a portable communications device coupled with said terminal and connectable to said at least one server via a second network independent of the first network, the coupling with said terminal is by wireless transmission therefrom, and die portable communications device including means for receiving wireless transmissions from the terminal are further configured to receive additional data transmitted wirelessly from other sources than said second network and wherein the portable communications device is provided with a buffer for received messages.

10. A method as clamied in claim 9, wherein the first network is the Internet and the received additional data comprises one or more Uniform Resource Locators.

11. A method as claimed in claim 9, further comprising the provision of a plurality of beacons distributed about a geographical location, with each of said beacons transmitting a respective item of said additional data to the or each portable communications device within a range for each of said becons.

12. A communication method for a networked system comprising at least one server and a plurality of terminals, comprising:
  receiving information at the terminals from the at least one server by means of a connection via a first network, comprising:
    storing a profile database that contains data representing a characteristic behavior of an associated user terminal network address or addresses, which data is acquired automatically in response to an activity of an associated user and being stored together with an associated user information in the profile database;
  interfacing a portable communications device with said terminals and connecting the portable communications with the at least one server via a second wireless network that is independent of the first network; and
  receiving wireless transmissions at the portable communication device from other sources than the second wireless network and wherein the portable communications device is provided with a buffer for received messages.

13. The method of claim 12, wherein interfacing further comprises interfacing the portable communications device that is a mobile telephone and said second network is a telecommunications network.

14. The method of claim 12, wherein receiving information further comprises the first network is the Internet and the terminals comprise at least a display device coupled with processor means hosting an Internet browser.

15. The method of claim 12, wherein receiving wireless transmission conforms to a predetermined set of communications protocols.

16. The method of claim 12 wherein interfacing further comprises the portable communications device receiving wireless transmissions from the terminals.

17. The method of claim 16 wherein interfacing further comprises buffering by the portable communications device to receive and store data transmitted wirelessly.

18. The method of claim 17 wherein interfacing further comprises stamping received items with a time of receipt.

19. The method of claim 17 wherein interfacing further comprises annotating to alter received items.

20. The method of claim 12 wherein interfacing further comprise interfacing by a plurality of beacons distributed about a geographical location, wherein each of said beacons transmits to each portable communications device within a range of each of said beacons.

* * * * *